United States Patent
Lee et al.

(10) Patent No.: US 12,165,051 B2
(45) Date of Patent: Dec. 10, 2024

(54) NEURAL NETWORK PARAMETER OPTIMIZATION METHOD AND NEURAL NETWORK COMPUTING METHOD AND APPARATUS SUITABLE FOR HARDWARE IMPLEMENTATION

(71) Applicant: DEEPER-I CO., INC., Seoul (KR)

(72) Inventors: Sang Hun Lee, Yongin-si (KR); Myung Kyum Kim, Suwon-si (KR); Joo Hyuk Kim, Seoul (KR)

(73) Assignee: DEEPER-I CO., INC., Seoul (KR)

(*) Notice: Subject to any disclaimer, the term of this patent is extended or adjusted under 35 U.S.C. 154(b) by 1327 days.

(21) Appl. No.: 16/626,493

(22) PCT Filed: Jul. 18, 2019

(86) PCT No.: PCT/KR2019/008913
§ 371 (c)(1),
(2) Date: Dec. 24, 2019

(87) PCT Pub. No.: WO2020/159016
PCT Pub. Date: Aug. 6, 2020

(65) Prior Publication Data
US 2020/0372340 A1    Nov. 26, 2020

(30) Foreign Application Priority Data

Jan. 29, 2019  (KR) .................. 10-2019-0011516
Jan. 29, 2019  (KR) .................. 10-2019-0058453

(51) Int. Cl.
*G06N 3/08*  (2023.01)
*G06N 3/02*  (2006.01)
(Continued)

(52) U.S. Cl.
CPC .............. *G06N 3/08* (2013.01); *G06N 3/02* (2013.01); *G06N 3/04* (2013.01); *G06N 3/082* (2013.01)

(58) Field of Classification Search
CPC .......... G06N 3/02; G06N 3/04; G06N 3/0454; G06N 3/063; G06N 3/08; G06N 3/082; G06N 3/084; G06N 5/046
See application file for complete search history.

(56) References Cited

U.S. PATENT DOCUMENTS

2016/0358068 A1    12/2016 Brothers et al.
2017/0011288 A1*    1/2017 Brothers .............. G06F 9/3017
(Continued)

FOREIGN PATENT DOCUMENTS

CN    107368885 A    11/2017
CN    108764471 A    11/2018
(Continued)

OTHER PUBLICATIONS

Molchanov, Pavlo, et al. "Pruning convolutional neural networks for resource efficient inference." arXiv preprint arXiv:1611.06440 v2 (2017): 1-17. (Year: 2017).*

(Continued)

*Primary Examiner* — Randall K. Baldwin
(74) *Attorney, Agent, or Firm* — NKL Law; Jae Youn Kim

(57) ABSTRACT

The present invention relates to a neural network parameter optimization method and a neural network computation method and apparatus suitable for hardware implementation. The neural network parameter optimization method suitable for hardware implementation according to the present invention may include transforming an existing parameter of a neural network into a signed parameter and a magnitude parameter having a single value for each channel and (Continued)

generating an optimized parameter by pruning the transformed magnitude parameter. Accordingly, the present invention provides a neural network parameter optimization method and a neural network computation method and apparatus thereof, which optimize a large amount of computation and parameters of a convolutional neural network to be effective in hardware implementation, thereby achieving minimal accuracy loss and maximum computation speed.

15 Claims, 12 Drawing Sheets

(51) Int. Cl.
  G06N 3/04    (2023.01)
  G06N 3/082   (2023.01)

(56) References Cited

U.S. PATENT DOCUMENTS

| | | | |
|---|---|---|---|
| 2017/0286830 A1* | 10/2017 | El-Yaniv | G06N 3/045 |
| 2018/0046900 A1 | 2/2018 | Dally et al. | |
| 2018/0082181 A1* | 3/2018 | Brothers | G06N 3/045 |
| 2018/0114114 A1* | 4/2018 | Molchanov | G06N 3/045 |
| 2018/0181867 A1 | 6/2018 | Seibold et al. | |
| 2018/0336468 A1* | 11/2018 | Kadav | G06V 10/454 |
| 2019/0188567 A1* | 6/2019 | Yao | G06N 3/082 |
| 2019/0347554 A1* | 11/2019 | Choi | G06N 3/082 |
| 2020/0134461 A1* | 4/2020 | Chai | G06N 3/084 |

FOREIGN PATENT DOCUMENTS

| | | |
|---|---|---|
| CN | 108932548 A | 12/2018 |
| KR | 10-2011-0027916 A | 3/2011 |
| KR | 10-2016-0143505 A | 12/2016 |
| KR | 10-2017-0128080 A | 11/2017 |
| KR | 20180037558 A | 4/2018 |
| WO | 2017-189859 A1 | 11/2017 |
| WO | 2020159016 A1 | 8/2020 |

OTHER PUBLICATIONS

Dai, Xiaoliang, Hongxu Yin, and Niraj K. Jha. "NeST: a Neural Network Synthesis Tool Based on a Grow-and-Prune Paradigm." arXiv preprint arXiv:1711.02017 v3 (2018): 1-13. (Year: 2018).*
Carreira-Perpinán, Miguel A., and Yerlan Idelbayev. ""learning-compression" algorithms for neural net pruning." Proceedings of the IEEE Conference on Computer Vision and Pattern Recognition. 2018: 8532-8541. (Year: 2018).*
Ye, Jianbo, et al. "Rethinking the smaller-norm-less-informative assumption in channel pruning of convolution layers." arXiv preprint arXiv:1802.00124 (2018): 1-11. (Year: 2018).*
Lin, Shaohui, et al. "Towards Compact ConvNets via Structure-Sparsity Regularized Filter Pruning." arXiv preprint arXiv:1901.07827 (Jan. 23, 2019): 1-14 (Year: 2019).*
Hanif, Muhammad Abdullah, Rehan Hafiz, and Muhammad Shafique. "Error resilience analysis for systematically employing approximate computing in convolutional neural networks." 2018 Design, Automation & Test in Europe Conference & Exhibition (Date). IEEE, 2018: 913-916 (Year: 2018).*
Evci, Utku. "Detecting dead weights and units in neural networks." arXiv preprint arXiv:1806.06068 (2018): i-92 (Year: 2018).*
Akhlaghi, Vahideh, et al. "Snapea: Predictive early activation for reducing computation in deep convolutional neural networks." 2018 ACM/IEEE 45th Annual International Symposium on Computer Architecture (ISCA). IEEE, 2018: 662-673 (Year: 2018).*
Yang, Maurice, et al. "Efficient hardware realization of convolutional neural networks using intra-kernel regular pruning." 2018 IEEE 48th International Symposium on Multiple-Valued Logic (ISMVL). IEEE, 2018: 180-185 (Year: 2018).*
Molchanov, Pavlo et al., "Pruning Convolutional Neural Networks for Resource Efficient Inference", Conference at ICLR, Jun. 8, 2017, pp. 1-17.
Shiming et al., Compressing Deep Neural Networks for Efficient Visual Inference, Proceedings of the IEEE International Conference on Multimedia and Expo (ICME), Jul. 14, 2017, pp. 667-672.

* cited by examiner

NEURAL NETWORK PARAMETER OPTIMIZATION METHOD AND NEURAL NETWORK COMPUTING METHOD AND APPARATUS SUITABLE FOR HARDWARE IMPLEMENTATION

TECHNICAL FIELD

The present invention relates to a computation in an artificial neural network, and more specifically, to a neural network parameter optimization method and a neural network computation method and apparatus suitable for hardware implementation.

BACKGROUND ART

Recently, with the development of artificial intelligence (AI) technology, AI techniques have been introduced and applied in various industries.

With such a trend, it is increasingly sought to implement an artificial neural network, such as a convolutional neural network, in hardware, in real time.

However, artificial neural network-related computation methods according to related arts are not easy to implement in practice because of a large number of parameters and the amount of computation in a convolutional neural network.

To solve this issue, parameter optimization methods, such as a method of omitting redundant parameters through training, a method of reducing the number of bits of a parameter, and the like, have been proposed to reduce the amount of computation while maintaining accuracy.

However, since the parameter optimization methods according to the related arts are limited to software computation methods that do not consider hardware implementation, there is a limitation in implementing a convolutional neural network in hardware, in real time by using only these methods.

Therefore, there is an urgent need for a practical and applicable technology for artificial neural network-related computation technology suitable for hardware implementation.

Technical Problem

The present invention is devised to solve the above problems and provide a neural network parameter optimization method and a neural network computation method and apparatus thereof for achieving minimal accuracy loss and maximum computation speed by effectively optimizing a large amount of computation and parameters of a convolutional neural network for hardware implementation.

In addition, the present invention provides a neural network parameter optimization method, and a neural network computation method and apparatus thereof, which can correct accuracy with minimal loss of computation speed.

Technical Solution

A neural network parameter optimization method according to one embodiment of the present invention includes transforming an existing parameter of a neural network into a signed parameter and a magnitude parameter having a single value for each channel and generating an optimized parameter by pruning the transformed magnitude parameter.

The signed parameter may determine a direction of elements for each channel of the existing parameter and the magnitude parameter may be obtained by optimizing weights to a single representative value for each channel of the existing parameter.

The transforming may include generating the magnitude parameter by calculating an average of absolute values of elements for each channel of the existing parameter.

The transforming may include generating the signed parameter by representing, as "0", an element value of the signed parameter that corresponds to a channel of the existing parameter which has a predetermined constituent element smaller than zero and representing, as "1", an element value of the signed parameter that corresponds to a channel of the existing parameter which has a predetermined constituent element is greater than or equal to zero.

The pruning may include calculating a reference value by using an average value and a magnitude distribution of a magnitude parameter for each input channel or an average value and a magnitude distribution of a magnitude parameter for each input and output channel; and setting a magnitude parameter having a value smaller than the calculated reference value to zero, thereby enabling omission of a convolution computation of a corresponding channel.

When pruning is performed using an average value of magnitude parameters and a magnitude distribution of input channels constituting a predetermined layer, the reference value may be calculated as the product of a layer-specific constant and the average value of the magnitude parameters of the input channels and when a value of a magnitude parameter of a predetermined input channel is smaller than the reference value, the pruning may be performed by changing the value of the magnitude parameter of the corresponding channel to zero, and when the pruning is performed using an average value of magnitude parameters and a magnitude parameter of input and output channels constituting a predetermined layer, the reference value may be calculated as the product of a layer-specific constant and an average value of magnitude parameters of the input channels and output channels and when a value of a magnitude parameter of a predetermined input channel is smaller than the reference value, the pruning may be performed by changing the value of the magnitude parameter of the corresponding channel to zero.

A value of the layer-specific constant may be determined according to a convolution parameter distribution for each layer.

The neural network parameter optimization method may further include transforming the existing parameter of the neural network into a scale parameter.

The neural network parameter optimization method may further include variably allocating a bit of the scale parameter and quantizing a range and a weight of a value of a scale parameter element according to a user's selection.

A neural network computation method according to another embodiment of the present invention includes loading an existing parameter and input channel data of a neural network to a memory, transforming the existing parameter into a signed parameter and a magnitude parameter having a single value for each channel and generating an optimized parameter by pruning the transformed magnitude parameter, inferring by performing a convolution computation on the optimized parameter and the input channel data, correcting the optimized parameter, and updating the existing parameter to the corrected optimized parameter.

The neural network computation method may further include determining whether or not a learned parameter is present, generating an initial parameter through parameter initialization when the learned parameter is not present, generating an optimized parameter for the initial parameter, and loading the existing parameter when the learned parameter is present.

The inferring by performing the convolution computation on the optimized parameter and the input channel data may include loading the optimized parameter to the memory, determining whether or not a value of a magnitude parameter included in the loaded optimized parameter is zero, and omitting a convolution computation process when the value of the magnitude parameter is zero.

The inferring by performing the convolution computation on the optimized parameter and the input channel data may include determining a direction of data by performing a bitwise operation on the signed parameter and the input channel data when the value of the magnitude parameter is not zero, performing an addition operation on a number of input channel data corresponding to a convolution parameter filter size, and performing a single multiplication operation on the magnitude parameter and the input channel data.

The inferring by performing the convolution computation on the optimized parameter and the input channel data may further include reducing an error of a computation result by differentially applying a weight to the magnitude parameter using a scale parameter, if present.

A neural network computation apparatus according to still another embodiment of the present invention includes a signed parameter transformation unit configured to transform an existing parameter into a signed parameter, a magnitude parameter transformation unit configured to transform the existing parameter into a magnitude parameter having a single value for each channel, and a parameter pruning unit configured to prune the transformed magnitude parameter to generate an optimized parameter.

The parameter pruning unit may calculate a reference value by using an average value and a magnitude distribution of a magnitude parameter for each input channel or an average value and a magnitude distribution of a magnitude parameter for each input and output channel and set a magnitude parameter having a value smaller than the calculated reference value to zero, thereby enabling omission of a convolution computation of a corresponding channel.

When pruning is performed using an average value of magnitude parameters and a magnitude distribution of input channels constituting a predetermined layer, the parameter pruning unit may calculate the reference value as the product of a layer-specific constant and the average value of the magnitude parameters of the input channels, and when a value of a magnitude parameter of a predetermined input channel is smaller than the reference value, may perform the pruning by changing the value of the magnitude parameter of the corresponding channel to zero, and when the pruning is performed using an average value of magnitude parameters and a magnitude parameter of input and output channels constituting a predetermined layer, the parameter pruning unit may calculate the reference value as the product of a layer-specific constant and an average value of magnitude parameters of the input channels and output channels, and when a value of a magnitude parameter of a predetermined input channel is smaller than the reference value, may perform the pruning by changing the value of the magnitude parameter of the corresponding channel to zero.

The neural network computation apparatus may further include a scale parameter transformation unit configured to transform the existing parameter into a scale parameter.

The neural network computation apparatus may further include an inference unit configured to perform a convolution computation on the optimized parameter and the input channel data.

The inference unit may determine whether or not a value of the magnitude parameter included in the optimized parameters is zero, and omit a convolution computation process when the value of the magnitude parameter is zero The inference unit may reduce an error of a computation result by differentially applying a weight to the magnitude parameter using a scale parameter, if present.

Advantageous Effects

As described above, the present invention provides a neural network parameter optimization method and a neural network computation method and apparatus thereof, which optimize a large amount of computation and parameters of a convolutional neural network to be effective in hardware implementation, thereby achieving minimal accuracy loss and maximum computation speed.

In addition, the present invention may satisfy low-power and high performance required in hardware operating in real time, in which a convolutional neural network is implemented, by optimizing parameters of the neural network. When the neural network parameter optimization technique according to one embodiment is applied, a computation may be omitted for each channel according to a size of a channel in a convolution computation. Furthermore, whether or not a computation is to be omitted for each channel is determined, rather than whether a computation for each element within a channel is to be omitted or performed in hardware, thereby making it possible to reduce the computation by a multiple of the number of channel elements.

Moreover, the present invention may correct accuracy with minimal loss of computation speed. For example, a scale parameter is separated, which allows a different weight to be effectively applied depending on a range of values, thereby efficiently increasing performance in hardware implementation.

MODE FOR INVENTION

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Figure 1:
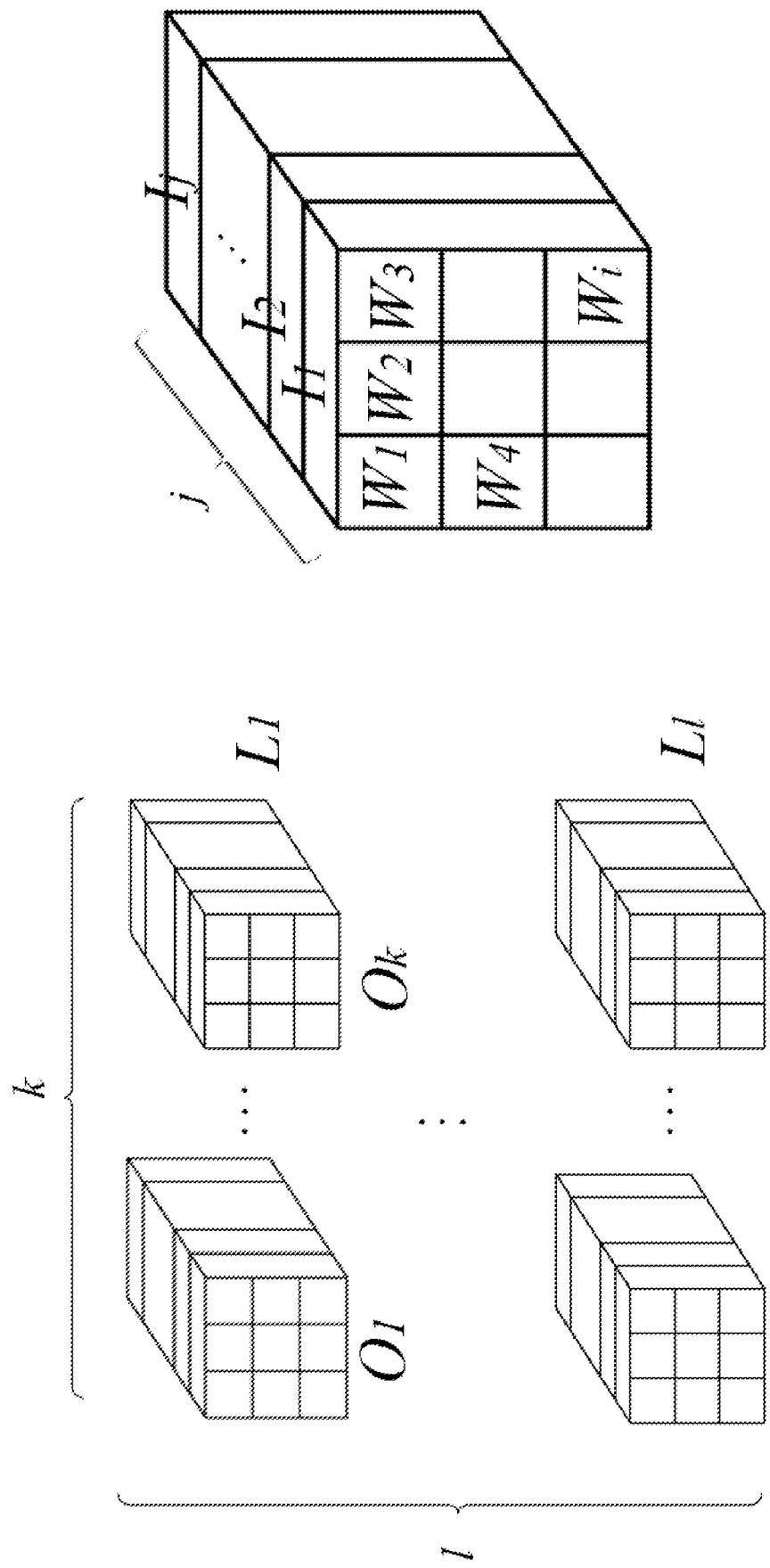
FIG. 1 is a diagram defining a convolution parameter used in a neural network convolution computation according to one embodiment of the present invention.

FIG. 1 is a diagram defining a convolution parameter used in a neural network convolution computation according to one embodiment of the present invention.

As shown in the drawing, referring to FIG. 1, when the total number of convolution layers of a neural network is denoted by l, k output channels O1, . . . , and Ok exist in each layer, and each output channel consists of j input channels I1, I2, . . . , and $I_j$. Each of the input channels has I weight parameters $W_1$, $W_2$, . . . , and $W_i$. In the present invention, an optimization technique is described with formulas based on the definition of the convolution parameter described above.

Figure 2:
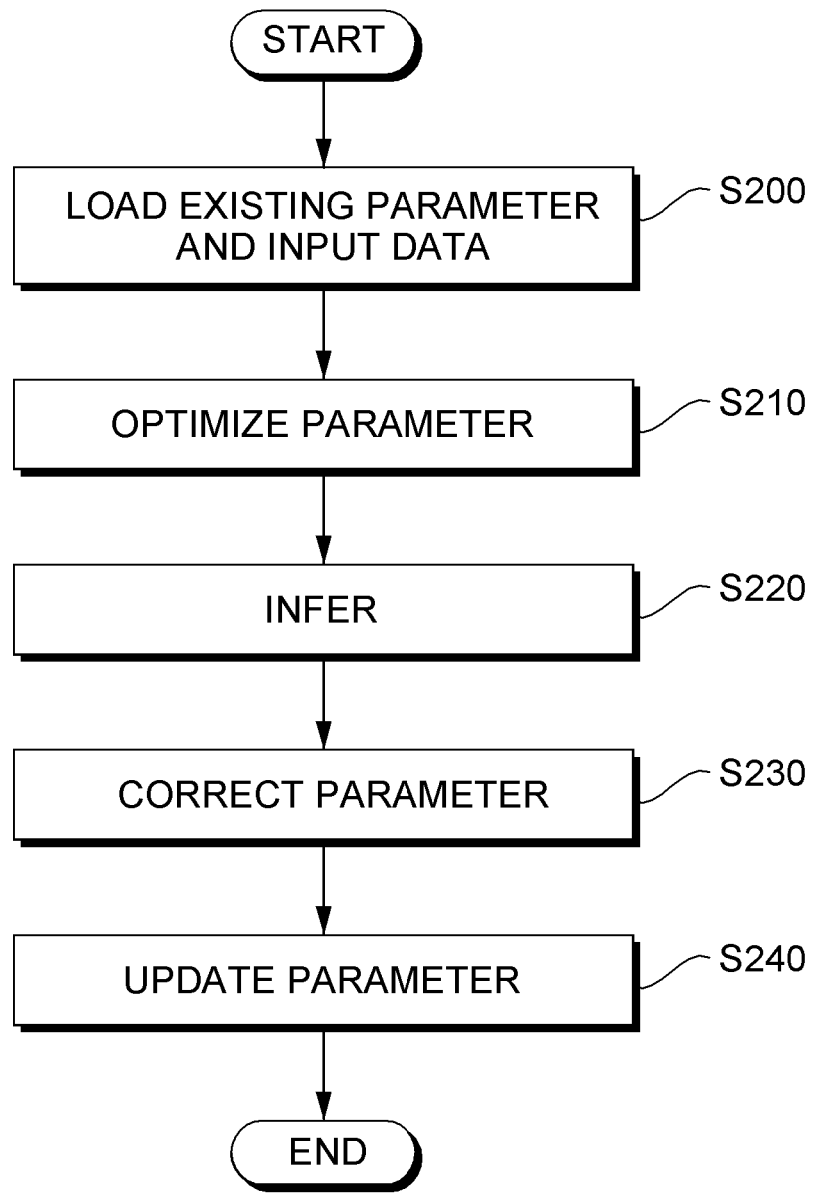
FIG. 2 is a diagram illustrating a learning process for generating an optimized parameter in a convolutional neural network (CNN) according to one embodiment of the present invention.

FIG. 2 is a diagram illustrating a learning process for generating an optimized parameter in a convolutional neural network (CNN) according to one embodiment of the present invention.

Referring to FIG. 2, a learning process may include an existing parameter and input data loading operation (S200), a parameter optimization operation (S210), an inference operation (S220) a correction operation (S230), and a parameter update operation (S240).

More specifically, when the parameter optimization operation (S210) is omitted, the process is the same as a general deep learning training procedure, which means that the present invention can be readily applied to a general deep learning training environment.

The CNN optimization technique according to one embodiment of the present invention may be performed by adding the parameter optimization operation (S210) to the existing learning environment when there are existing learned parameters. In this case, when there are no existing learned parameters, the parameter optimization operation (S210) may be applied after initial learning is performed in which the parameter optimization operation (S210) is omitted. On the other hand, when learning is performed by applying the parameter optimization operation (S210) from the beginning, the accuracy of the result may be lowered as compared to the same amount of computation reduction. For this reason, after existing learned convolution parameters and input data are loaded to a memory (S200), the convolution parameter optimization technique proposed by the present invention is applied to the loaded existing convolution parameters (S210).

Then, inference (S220) is performed by performing a convolution computation on the input data and the parameters to which the optimization is applied, and the existing parameters are updated (S240) after the parameter correction operation (S230). The parameter correction operation (S230) includes a process of computing backpropagation. After the learning is terminated, the parameters are stored using the convolution parameter optimization technique. The parameter optimization operation (S210), the inference operation (S220), the parameter correction operation (S230), and the update operation (S240) may be repeatedly performed until the target number of times of operations is reached.

Figure 3:
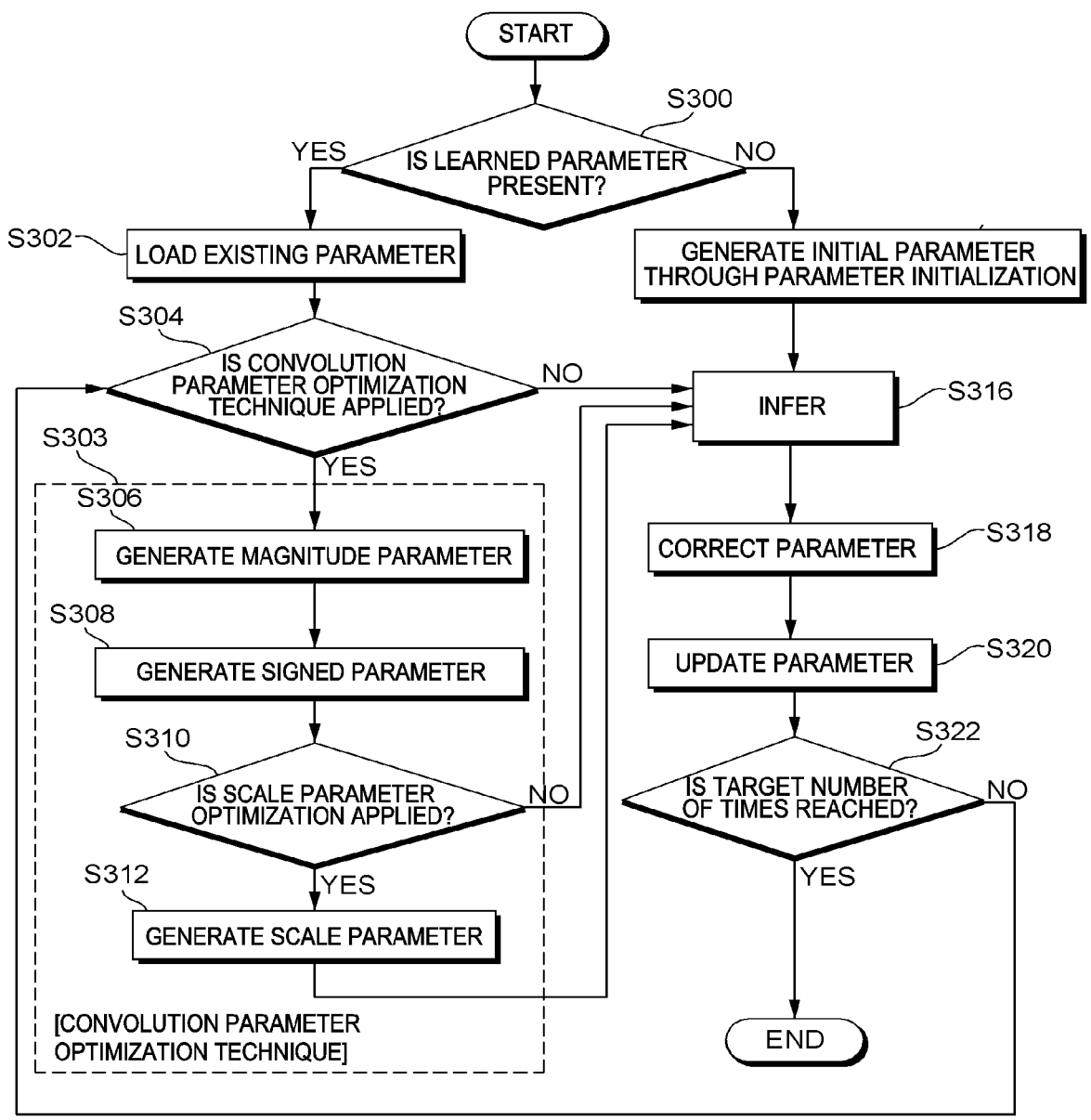
FIG. 3 is a detailed diagram illustrating the learning process for generating the optimized parameter of FIG. 2 according to one embodiment of the present invention.

FIG. 3 is a detailed diagram illustrating the learning process for generating the optimized parameter of FIG. 2 according to one embodiment of the present invention.

Referring to FIG. 3, a neural network computing apparatus according to one embodiment of the present invention, first, determines whether or not there are learned parameters (S300). Then, when there are learned parameters, the parameters are loaded to a memory (S302). Then, the neural network operation apparatus determines whether to apply a convolution parameter optimization (S303) of the present invention (S304). The learning process to which the convolution parameter optimization (S303) is not applied is identical to the general deep learning training procedure.

The convolution parameter optimization operation (S303) may include a magnitude parameter generation operation (S306) and a signed parameter generation operation (S308), and may further include an operation (S310) of determining whether to apply scale parameter optimization (S310) and an operation (S312) of generating a scale parameter when the scale parameter optimization is determined to be applied.

According to an embodiment of the present invention, when the convolution parameter optimization operation (S303) is completed, the neural network computing apparatus performs inference with the optimized parameter and input data through an inference operation (S316) and updates (S320) the existing parameter to the optimized and corrected parameter through a correction operation (S318). In this case, it is determined (S322) whether or not the target number of times of operations is reached. When the target number of times is not reached, the convolution parameter optimization operation (S303), the inference operation (S316), the correction operation (S318), and the parameter update operation (S320) are repeatedly performed.

Figure 4:
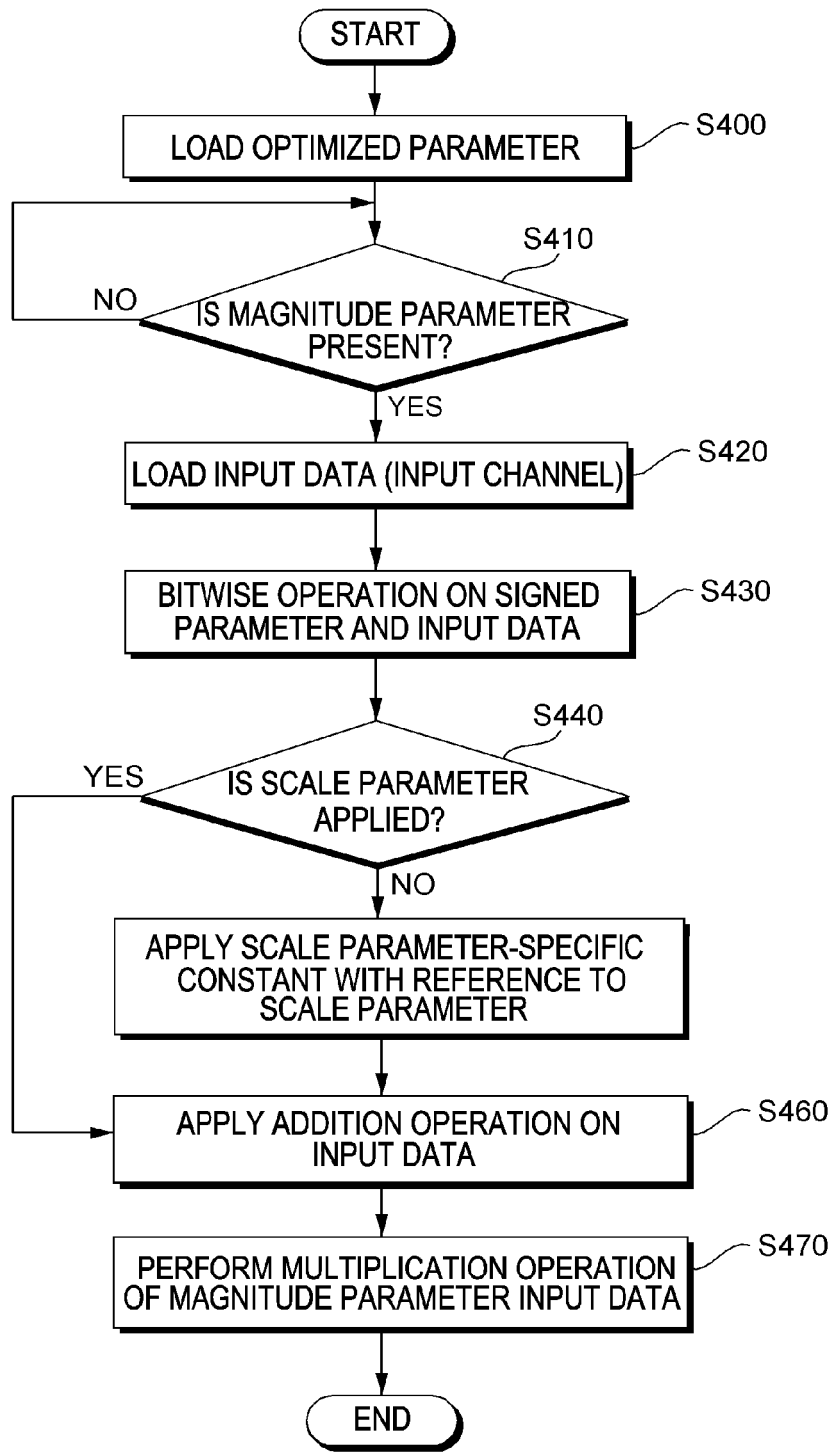
FIG. 4 is a detailed diagram illustrating an inference process according to one embodiment of the present invention.

FIG. 4 is a detailed diagram illustrating an inference process according to one embodiment of the present invention.

Referring to FIG. 4, a neural network computing apparatus according to one embodiment of the present invention loads an optimized parameter to a memory (S400) and determines whether or not there is a magnitude parameter value, i.e., whether a magnitude parameter value is zero or not (S410). When the magnitude parameter value is zero, the amount of inference computation may be reduced by omitting subsequent operations.

Then, when the magnitude parameter value is not zero, input data is loaded to the memory (S420), and a bitwise operation is performed on a signed parameter and the input data (S430). Then, an addition operation of the input data is applied (S460) and a multiplication operation of the magnitude parameter and the input data is performed (S470). When a scale parameter is applied (S440) after the bitwise operation (S430), an operation (S470) of applying a scale parameter-specific constant to the magnitude parameter with reference to the scale parameter may be further included.

Figure 5:
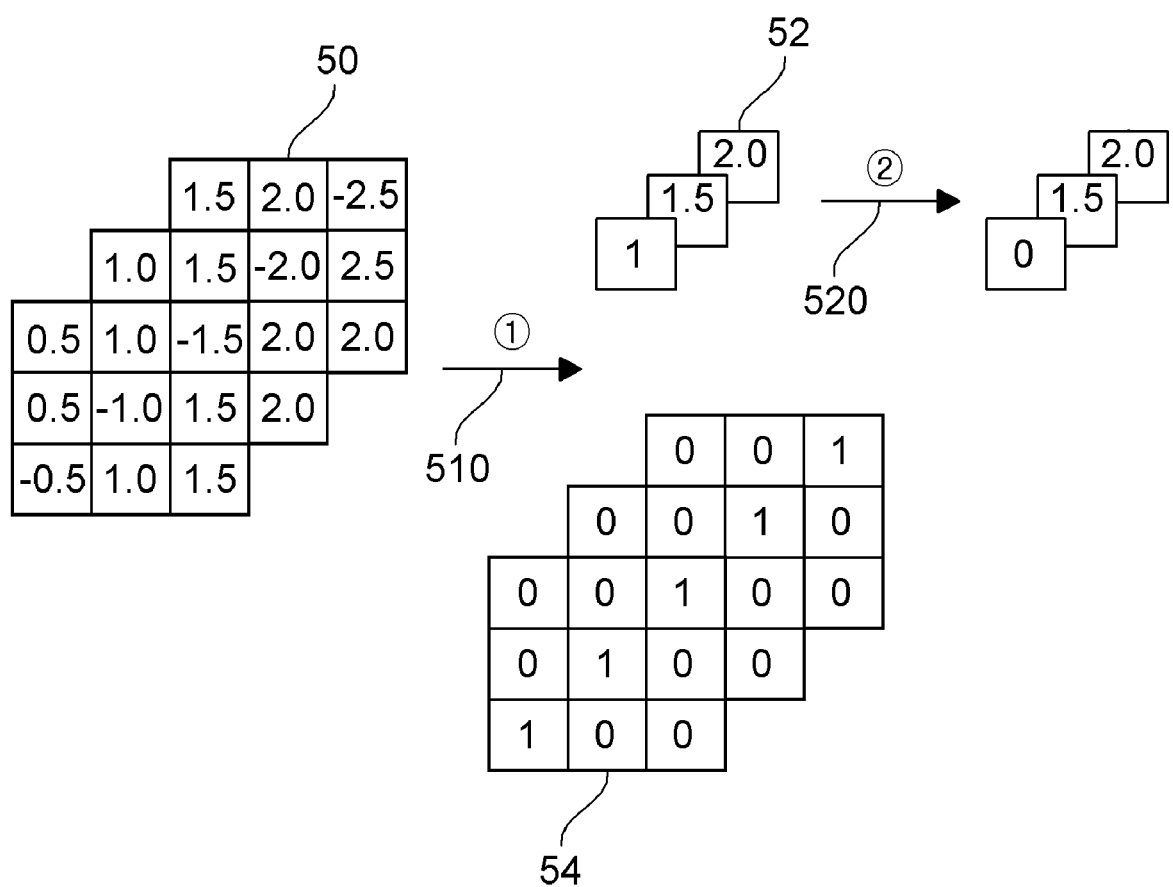
FIG. 5 is a diagram an application example of a convolution parameter optimization process according to one embodiment of the present invention.

FIG. 5 is a diagram an application example of a convolution parameter optimization process according to one embodiment of the present invention.

Referring to FIG. 5, a parameter optimization process according to one embodiment largely consists of a transformation operation 510 and a pruning operation 520. The parameter transformation 510 refers to a process of reducing the amount of computation of existing convolution parameters and converting the parameters into a form that is easy to prune. For example, as shown in FIG. 5, an existing parameter 50 is divided into a magnitude parameter 52 indicating a magnitude and a signed parameter 54 indicating a direction. FIG. 5 illustrates an example in which the existing parameter has three input channels 50-1, 50-2, and 50-3. Each of the input channels 50-1, 50-2, and 50-3 consists of a plurality of parameter elements. The signed parameter 54 determines a direction of elements of each channel of the existing parameter 50 and the magnitude parameter 52 is obtained by optimizing weights to a single representative value for each channel of the existing parameter 50.

A user may arbitrarily set the number of bits of each constituent element of the magnitude parameter 52 and the number of bits may be expressed as an integer, a floating point number, or the like. As the number of bits increases, the same result as the original convolution computation result is obtained. The number of bits of each constituent element in the signed parameter 54 is 1 bit, which indicates a positive (+) direction or a negative (−) direction only. Various methods 50 may be applied to separate the magnitude parameter 52 and the signed parameter 54 from the existing parameter. For example, a transformation may be performed through an average of input channels of a convolution layer and a most significant bit of each parameter.

One of the methods of transformation into a magnitude parameter 52 is to use an average value of constituent elements (weight parameters) of input channels. For example, when i constituent elements are denoted by $W_i$, j input channels are denoted by $I_j$, k output channels are denoted by $O_k$, and a magnitude parameter is denoted by $M=\{M_1, M_2, \ldots, M_j\}$, $M_j$ is represented by Equation 1.

$$M_j = \frac{1}{i} \underset{n=1}{\overset{i}{Q}} |W_n| \qquad \text{[Equation 1]}$$

One of methods of transformation into a signed parameter 54 is to allocate a value of 0 when constituent elements (weight parameters) of channels are greater than or equal to 0, and allocate a value of 1 when the constituent elements are smaller than 0. That is, when the signed parameter is denoted by $S=\{S_1, S_2, \ldots, S_i\}$, $S_i$ is represented by Equation 2.

$$S_i = \begin{cases} 0, \text{ if } W_i E 0 \\ 1, \text{ if } W_i < 0 \end{cases} \qquad \text{[Equation 2]}$$

After the transformation process is performed, the pruning operation 520 for removing redundant parameters is performed. In the pruning operation 520, parameters with low importance are selected and values thereof are set to zero, which makes it possible to omit computation, thereby reducing the total amount of computation. In this case, the magnitude parameter is pruned according to the magnitude to generate an optimized parameter. For example, when a value of a predetermined magnitude parameter is smaller than a preset reference value, the magnitude parameter of a corresponding channel is pruned.

In this case, it is important that the pruning process is not applied to the entire convolution layer parameters, but only to the transformed magnitude parameter 52. The pruning 520 is applied only to the magnitude parameter 52, so that omitted parameters affect all parameters of each input channel of the convolution layer, thereby maximizing the effect of pruning 520.

Various methods may be applied to omit redundant parameters. For example, pruning is performed using an average value and a distribution for each convolution layer input channel and output channel. Each layer has a constant that the user arbitrarily sets, and the constant is determined by a convolution parameter distribution for each layer. The reference value for omitting a value may be an average value of the magnitude parameter of the input channels or the product of a weight and an average of magnitude parameters of the input channel and output channel. A layer constant has a value of 0 to 1, and when a convolution parameter in each layer is assumed to be a continuous uniform distribution or a normal distribution, the layer constant may have a value of 0.5 to 0.7 to omit 50% of magnitude parameter. With reference to this value, the layer constant may be determined by taking into account the actual parameter distribution.

When $M_{LOI}=\{M_{111}, M_{112}, \ldots, M_{ikj}\}$, $L=\{C_1, C_2, \ldots, C_l\}$, C denotes a layer constant, a magnitude parameter pruning method to which a criterion for each input channel is applied is represented by Equation 3 below.

$$M'_{LOI} = \begin{cases} M_{ikj}, \text{ if } M_{ikj} E \frac{1}{j} \underset{n=1}{\overset{j}{Q}} M_{lkn} EL_l \\ 0, \text{ if } M_{ikj} < \frac{1}{j} \underset{n=1}{\overset{j}{Q}} M_{lkn} EL_l \end{cases} \qquad \text{[Equation 3]}$$

A magnitude parameter pruning method to which a criterion for each output channel is applied is represented by Equation 4 below.

$$M'_{LOI} = \begin{cases} M_{lkj}, \text{ if } M_{lkj} E \frac{1}{k}\frac{1}{j} \underset{m=1}{\overset{k}{Q}} \underset{n=1}{\overset{j}{Q}} M_{lmn} EL_l \\ 0, \text{ if } M_{lkj} < \frac{1}{k}\frac{1}{j} \underset{m=1}{\overset{k}{Q}} \underset{n=1}{\overset{j}{Q}} M_{lmn} EL_l \end{cases} \qquad \text{[Equation 4]}$$

Hereinafter, an example of a convolution parameter optimization calculation to which the above-described Equations 1 to 4 are applied is described.

It is assumed that a magnitude parameter and a signed parameter are calculated for an existing convolution parameter having i=4, j=2, and k=2 and the magnitude parameter is pruned. In this case, it is assumed that $O_1=\{I_{11}, I_{12}\}=\{[W_{111}, W_{112}, W_{113}, W_{114}], [W_{121}, W_{122}, W_{123}, W_{124}]\}=\{[-0.5, 1.0, 0.5, -1.0], [1.0, -1.5, 1.0, -1.5]\}$ and $O_2=\{I_{21}, I_{22}\}=\{[W_{211}, W_{212}, W_{213}, W_{214}], [W_{231}, W_{222}, W_{223}, W_{224}]\}=\{[1.5, -2.0, -1.5, 2.0], [-2.0, -2.5, 2.0, 2.5]\}$.

The magnitude parameter calculated by applying Equation 1 is $M=\{M_{11}, M_{12}, M_{21}, M_{22}\}=\{0.75, 1.25, 1.75, 2.25\}$. That is, $M_{11}=\frac{1}{4}(0.5+1.0+0.5+1.0)=0.75$, $M_{12}=\frac{1}{4}(1.0+1.5+1.0+1.5)=1.25$, $M_{21}=\frac{1}{4}(1.5+2.0+1.5+2.0)=1.75$, and $M_{22}=\frac{1}{4}(2.0+2.5+2.0+2.5)=2.25$ The signed parameter calculated by applying Equation 2 is S={$S_1$, $S_2$, $S_3$, $S_4$}={[1, 0, 0, 1], [0, 1, 0, 1], [0, 1, 1, 0], [1, 1, 0, 0]}.

An example of pruning of a magnitude parameter is as follows. In the case of an existing parameter having j=2, k=2, and l=1, when it is given that magnitude parameter separated from the existing parameter is M={$M_{111}$, $M_{112}$, $M_{121}$, $M_{122}$}={0.75, 1.25, 1.75, 2.25} and a layer constant is $L_1$=0.9, a pruned magnitude parameter is obtained as M'={$M_{111}$, $M_{112}$, $M_{121}$, $M_{122}$}={0, 1.25, 0, 2.25} by applying Equation 3 for each input channel. For example, in the case of $M_{112}$, which is 1.25<½(0.75+1.25)·0.9, $M_{112}$ is 0 according to Equation 3.

When Equation 4 is applied for each input channel and output channel, pruned magnitude parameter is obtained as M'={$M_{111}$, $M_{112}$, $M_{121}$, $M_{122}$}={0, 0, 1.75, 2.25}. In the case of $M_{112}$, which is 1.25<¼(0.75+1.25+1.75+2.25)·0.9, $M_{112}$ is 0 according to Equation 4. It may be determined whether to apply for each input channel or each output channel, depending on a distribution.

Figure 6:
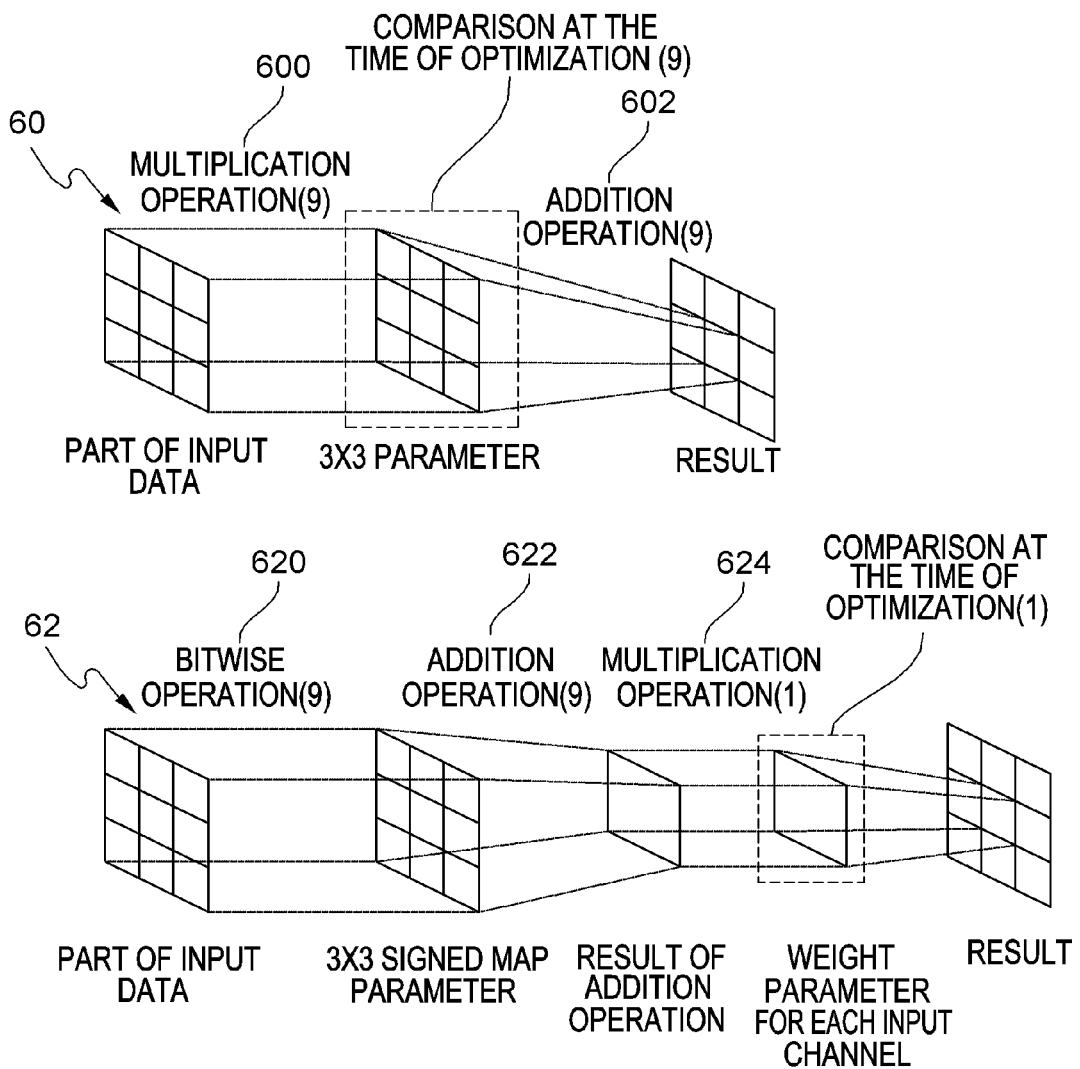
FIG. 6 is a diagram comparing a general convolution computation and a convolution computation according to one embodiment of the present invention.

FIG. 6 is a diagram comparing a general convolution computation and a convolution computation according to one embodiment of the present invention.

Referring to FIG. 6, a general convolution computation 60 requires a number of multiplication operations 600 and addition operations 602 corresponding to a convolution parameter filter size. However, in the convolution computation 62 to which parameter optimization according to one embodiment is applied, a direction of data may be determined through a bitwise operation 620, a number of addition operations 622 may be performed corresponding the filter size, and thereafter, a result may be derived through a single multiplication operation 624. For example, as shown in FIG. 6, the general convolution computation 60 requires 9 multiplication operations 600, whereas the convolution computation 62 to which the parameter optimization according to one embodiment is applied requires only one multiplication operation. This indicates that there is an advantage in that the number of multiplication operations is reduced by a number corresponding to the filter size.

In addition, when pruning is performed without transformation of a convolution parameter, a number of comparison operations corresponding to the filter size are required to determine whether or not operations are to be omitted. In the case of the general convolution computation 60 shown in FIG. 6 requires a total of 9 comparison operations. However, in the case of the convolution computation 62 to which the parameter optimization of the present invention is applied, it is possible to determine whether not to omit an operation through only a single comparison for each convolution layer input channel. Such a reduction in the amount of computation leads to fewer operators than those of the existing convolution computation 60. Therefore, it is possible to efficiently design hardware.

Figure 7:
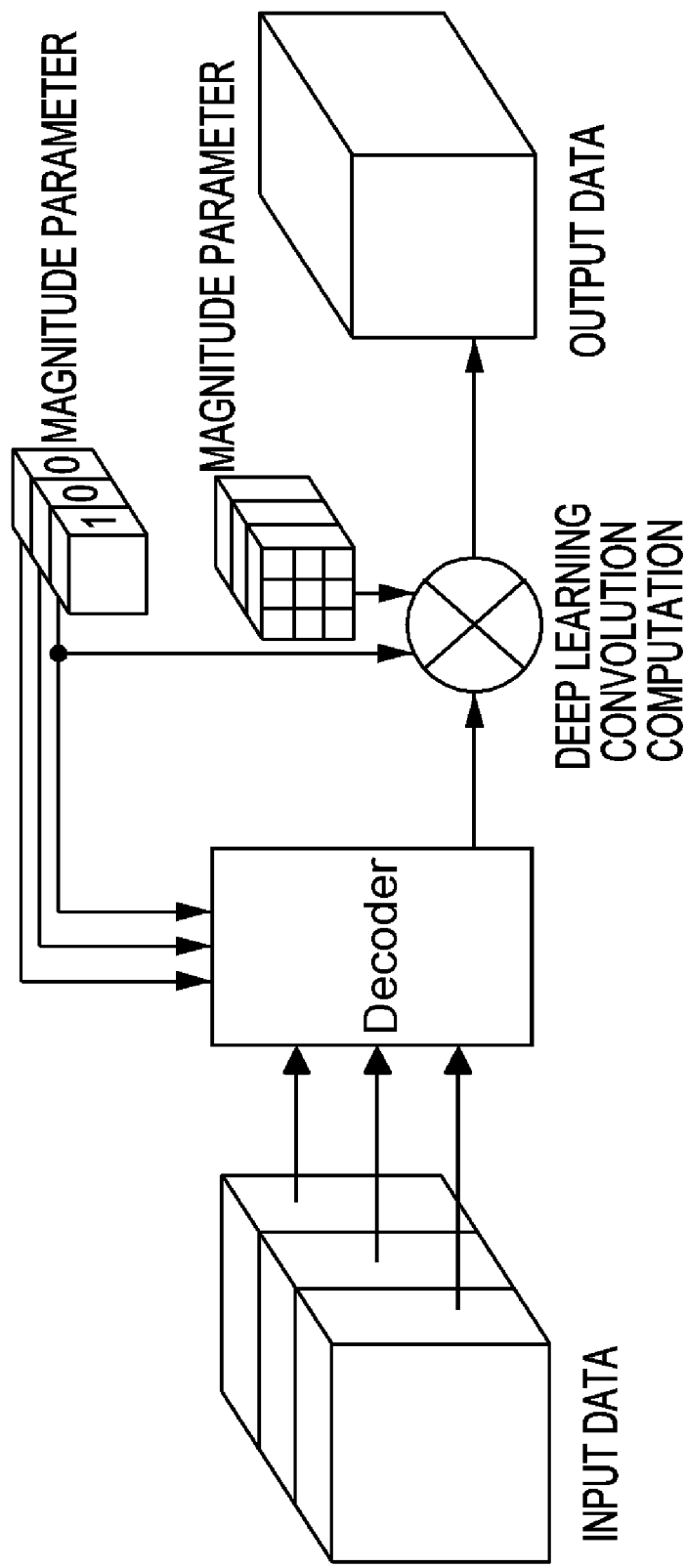
FIG. 7 is a diagram illustrating advantages of a convolution computation after parameter optimization according to one embodiment of the present invention.

FIG. 7 is a diagram illustrating advantages of a convolution computation after parameter optimization according to one embodiment of the present invention.

Referring to FIG. 7, a convolution of input data, a magnitude parameter, and a signed parameter is computed to produce output data, wherein when a magnitude parameter value is zero, there is no need to perform a computation, and hence the amount of computation may be greatly reduced on a channel-by-channel basis.

Figure 8:
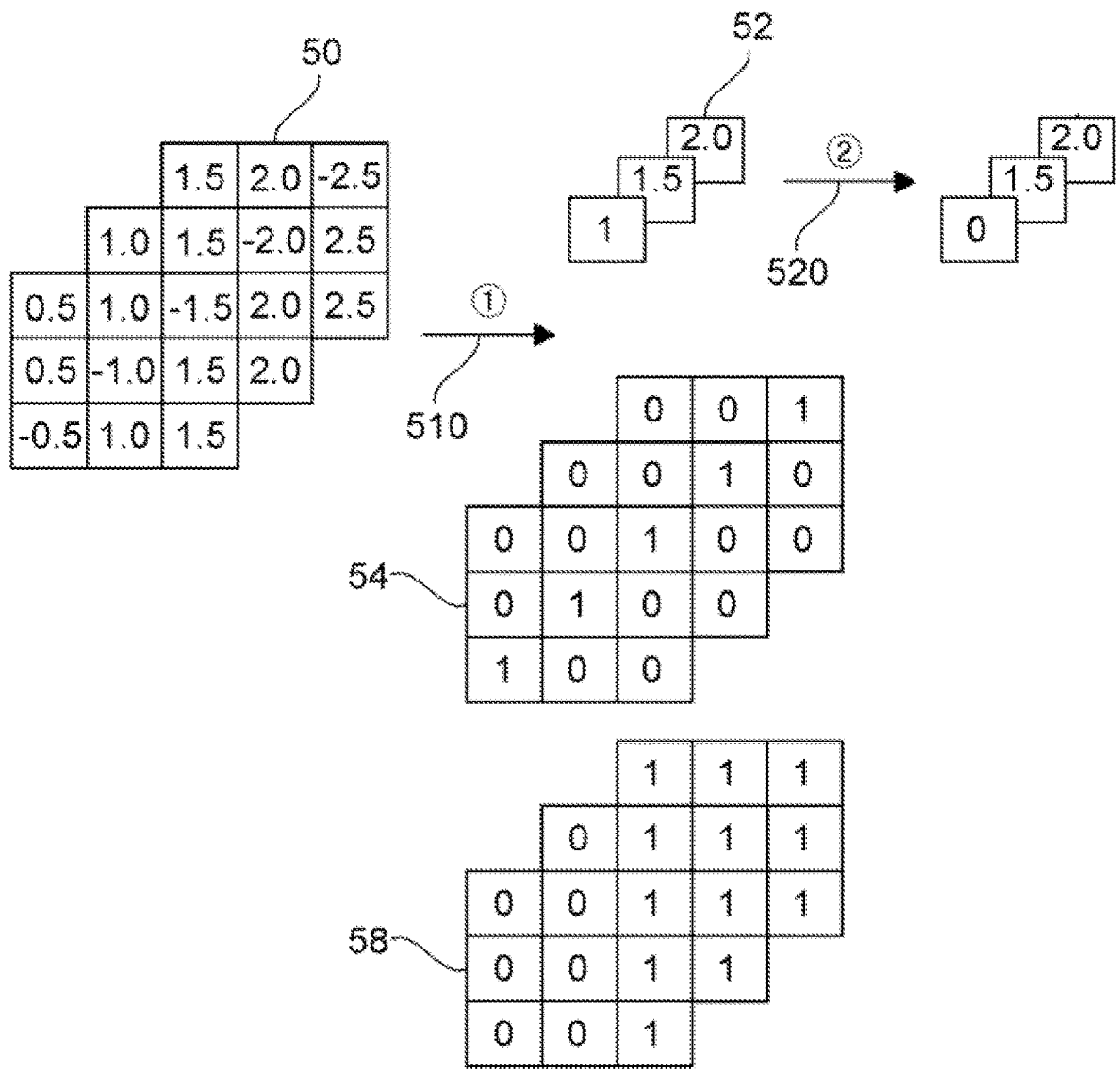
FIG. 8 is a diagram illustrating an application example of a convolution parameter optimization process according to another embodiment of the present invention.

FIG. 8 is a diagram illustrating an application example of a convolution parameter optimization process according to another embodiment of the present invention.

Convolution parameter optimization aims to achieve maximum accuracy with maximum optimization (reduction of computation). The reduction of computation and the accuracy are generally inversely proportional to each other. In an actual application stage, there is a level of performance (speed and accuracy) required to be satisfied, which is not easy for a user to control. To overcome this issue, the present invention proposes an optimization technique using a scale parameter. The technique proposed is implemented by applying a scale parameter to the optimization technique described above with reference to FIG. 5.

In the transformation process (510), forms of an existing parameter 50 is converted into a magnitude parameter 52, a signed parameter 54, and a scale parameter 58, and only the magnitude parameter 52 is pruned (520). At the time of inference, weights are applied to the magnitude parameter with reference to the scale parameter 58 so as to reduce an error of the existing computation result.

The scale parameter 58 indicates how important the magnitude parameter 52 is. That is, provided is a method of differentially applying a constant by comparing the importance of convolution layer input channel parameters. For one constituent element of the scale parameter 58, the user may allocate a desired bit, thereby adjusting the degree of optimization. The scale parameter 58 does not mean a weight and there are constant values referring to the scale parameter 58. These constants are assigned a value that is easy to implement in hardware, and they are allowed to be implemented by only a bitwise operation. When optimization is performed by applying weights through the scale parameter 58, rather than by directly applying a value of the magnitude parameter 52, the similarity to the original parameter before optimization is increased and accuracy is raised.

Figure 9:
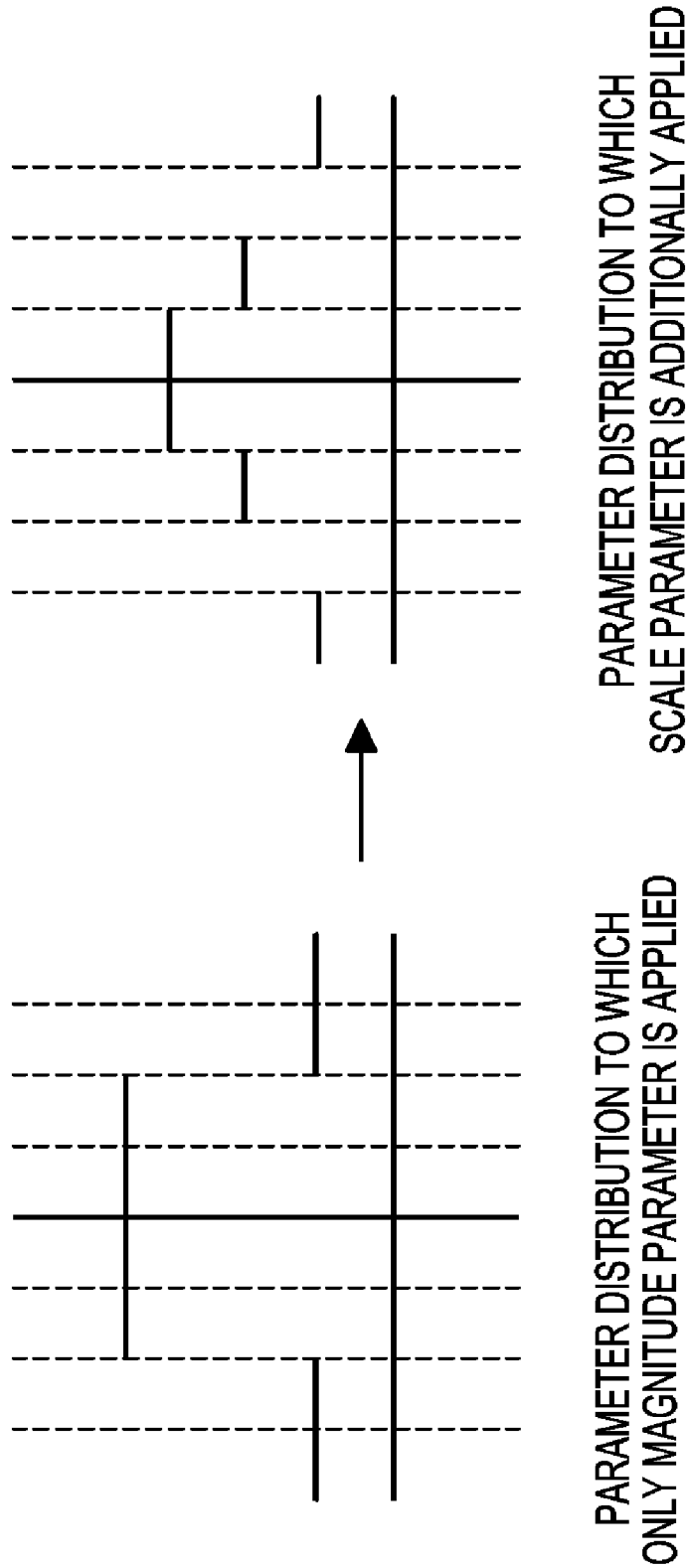
FIG. 9 is a diagram comparing a parameter distribution to which only a magnitude parameter is applied and a parameter distribution to which a scale parameter is additionally applied to describe a scale parameter optimization.

FIG. 9 is a diagram comparing a parameter distribution to which only a magnitude parameter is applied and a parameter distribution to which a scale parameter is additionally applied to describe a scale parameter optimization.

Referring to FIGS. 8 and 9, various methods may be applied to generate a scale parameter 58. In the present invention, the scale parameter 58 is generated through a distribution of convolution parameters. When the number of scale parameter bits is assumed to be b, there are $2^b$ arbitrary constants defined by the user, which are referred to as scale parameter-specific constants. The scale parameter-specific constants may be arbitrarily specified by the user based on a convolution parameter distribution, and they are constants that correspond to the scale parameter Below is an example of computing the scale parameter 58.

When it is given that the number of scale parameter bits is b, $\lambda$={$\lambda_1$, $\lambda_2$, ..., $\lambda_t$}, t={1, 2, ..., $2^b$−1}, $\lambda_t$>$\lambda_{t+1}$, and scale parameter SC={$SC_1$, $SC_2$, ..., $SC_i$}, $SC_i$ is represented by Equation 5 below.

$$SC_i = \begin{cases} t, \text{ if } \frac{1}{i}\sum_{n=1}^{i}|W_n|E\lambda_t E|W_n|E\frac{1}{i}\sum_{n=1}^{i}|W_n|E\lambda_{t+1}, kt < 2^b - 1 & \\ 0, \text{ if } |W_n| > \frac{1}{i}\sum_{n=1}^{i}|W_n|E\lambda_t, t = 1 & \\ 2^b - 1, \text{ if } |W_n|D\frac{1}{i}\sum_{n=1}^{i}|W_n|E\lambda_t, t = 1 & \end{cases}$$ [Equation 5]

At the time of inference, the product of the scale parameter-specific constant and the magnitude parameter is used as an actual calculation value.

Hereinafter, a scale parameter optimization calculation example to which Equation 5 described above is applied will be described.

It is assumed that a scale parameter is calculated for an existing convolution parameter having i=4, j=2, and k=2. It is assumed that the number of scale parameter bits b=2, t={1, 2, 3}, and λ={0.9, 0.7, 0.5}. Here, it is assumed that $O_1=\{I_{11}, I_{12}\}=\{W_{111}, W_{112}, W_{113}, W_{114}, W_{121}, W_{122}, W_{123}, W_{124}\}=\{-0.5, 1.0, 0.5, -1.0, 1.0, -1.5, 1.0, -1.5\}$ and $O_2=\{I_{21}, I_{22}\}=\{W_{211}, W_{212}, W_{213}, W_{214}, W_{231}, W_{222}, W_{223}, W_{224}\}=\{1.5, -2.0, -1.5, 2.0, -2.0, -2.5, 2.0, 2.5\}$.

$SC_{111}$ is 2 according to Equation 5 because $¼(0.5+1.0+0.5+1.0)·0.7>|-0.5|>¼(0.5+1.0+0.5+1.0)·0.5$. In this way, a scale parameter is calculated as $SC_i=(SC_{111}, SC_{112}, SC_{113}, SC_{114}, SC_{121}, SC_{122}, SC_{123}, SC_{124}, SC_{211}, SC_{212}, SC_{213}, SC_{214}, SC_{221}, SC_{222}, SC_{223}, SC_{224})=\{2, 0, 2, 0, 1, 0, 1, 0, 1, 0, 1, 0, 1, 0, 1, 0\}$.

Figure 10:
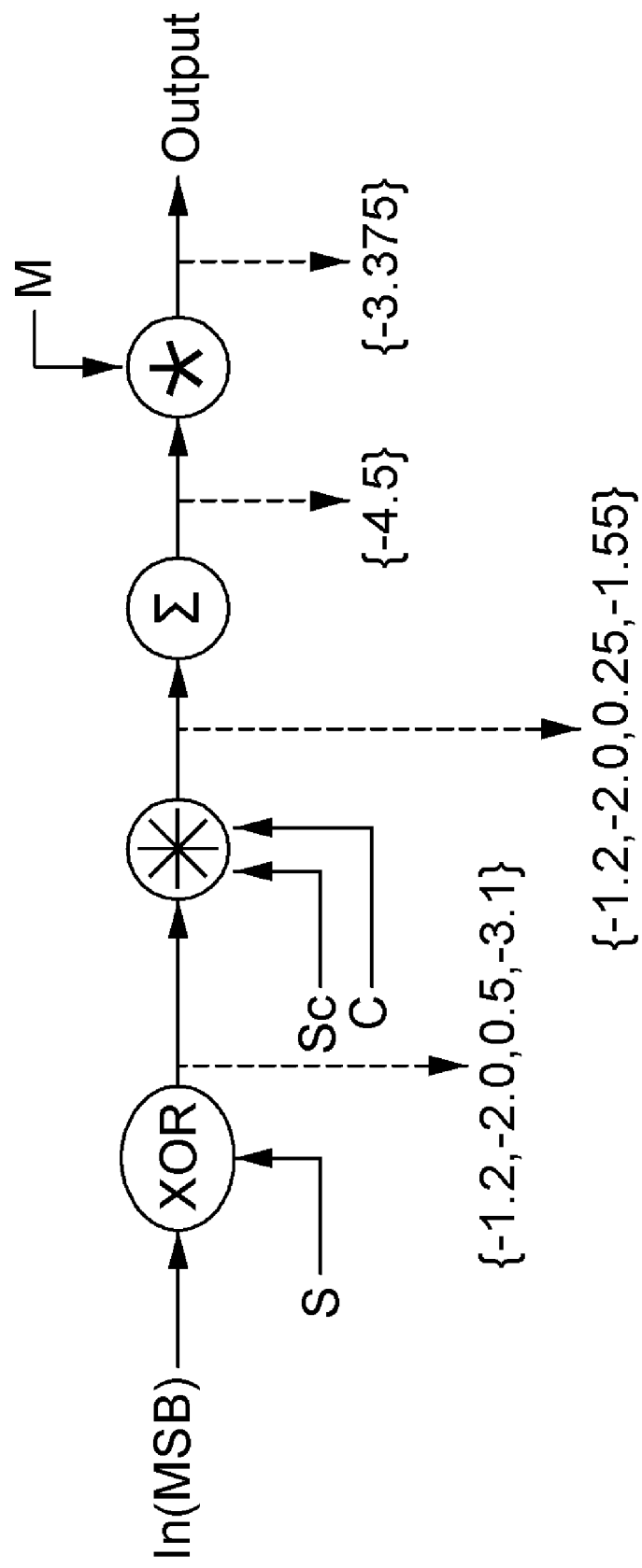
FIG. 10 is a diagram illustrating an example of a convolution computation using optimized parameters according to one embodiment of the present invention.

FIG. 10 is a diagram illustrating an example of a convolution computation using an optimized parameter according to one embodiment of the present invention.

As shown in FIG. 10, a magnitude parameter M, a signed parameter S, a scale parameter SC, and a scale parameter-specific constant C exist, a convolution computation when input data In is input is as shown in FIG. 10. Here, an example is taken where M={0.75}, S={0, 0, 1, 1}, SC={0, 0, 1, 1}, C={1.0, 0.5}, and input data In={1.2, -2.0, 0.5, 3.1}.

In the example of FIG. 10, the scale parameter-specific constant C is set to a multiple of 2 and a result is derived by a shift-bitwise operation rather than by a general arithmetic operation. In this case, there is an advantage in hardware implementation.

Figure 11:
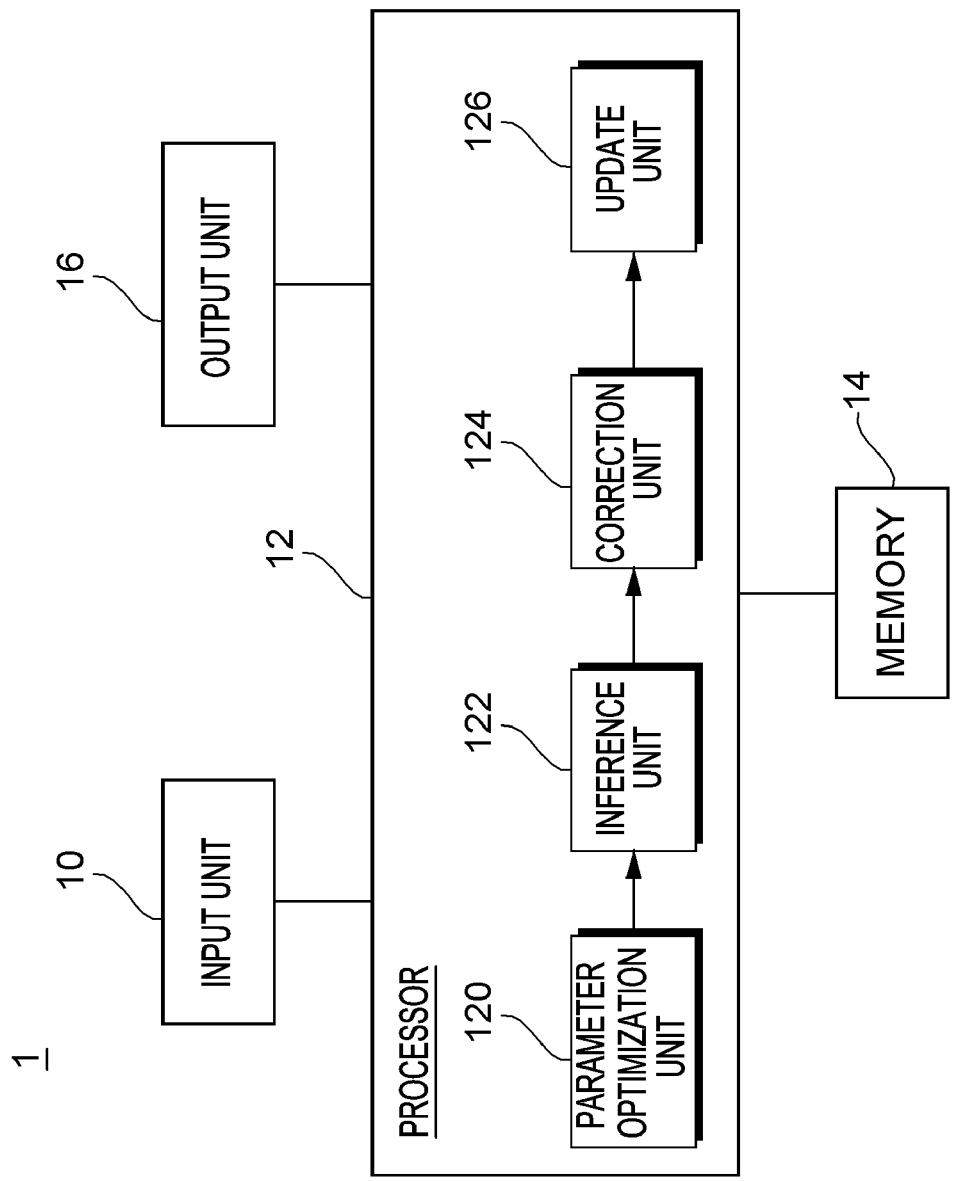
FIG. 11 is a diagram illustrating a configuration of a neural network computation apparatus according to one embodiment of the present invention.

FIG. 11 is a diagram illustrating a configuration of a neural network computation apparatus according to one embodiment of the present invention.

As shown in FIG. 11, a neural network computation apparatus 1 according to one embodiment of the present invention may include an input unit 10, a processor 12, a memory 14, and an output unit 16.

The input unit 10 may receive data including a user instruction and the input data is stored in the memory 14. The processor 12 may perform a neural network computation, store a computation result in the memory 14, and output the computation result through the output unit 16. The input data and parameters may be loaded to the memory 14. The processor 12 according to one embodiment includes a parameter optimization unit 120, an inference unit 122, a correction unit 124, and an update unit 126.

The parameter optimization unit 120 transforms an existing parameter and prunes a magnitude parameter among the transformed parameters. The existing parameters may be already learned parameters and are loaded to the memory for computation.

The parameter optimization unit 120 according to one embodiment of the present invention transforms the existing parameter into a magnitude parameter and a signed parameter, or transforms the parameter into a magnitude parameter, a signed parameter, and a scale parameter. The signed parameter determines a direction of elements of each channel of the existing parameter and the magnitude parameter is obtained by optimizing weights to a single representative value for each channel of the existing parameter. The scale parameter indicates how important the magnitude parameter, and a differential weight may be applied to the magnitude parameter with reference to the scale parameter at the time of inference.

In the embodiment of the present invention, the pruning is performed only for the magnitude parameter among the transformed parameters. The pruning means selecting a magnitude parameter with low importance and setting a value thereof to zero. A convolution computation for the pruned parameter can be omitted on a channel-by-channel basis so that an effect of reducing the total amount of computation can be achieved. The pruning process affects all the parameter elements that constitute each input channel of a convolution layer and the effect of pruning may be maximized.

In addition, the inference unit 122 infers by performing a convolution computation on the optimized parameters and the input data. Here, the inference unit 122 may determine whether or not a value of the magnitude parameter included in the optimized parameters is zero, and omit a convolution computation process when the value of the magnitude parameter is zero. In addition, when a scale parameter exists, the inference unit 122 may differentially apply a weight to the magnitude parameter using the scale parameter, thereby reducing an error of a computation result. In the embodiment of the present invention, the correction unit 124 corrects the optimized parameters, and the update unit 126 updates the existing parameter to the corrected optimized parameter.

Figure 12:
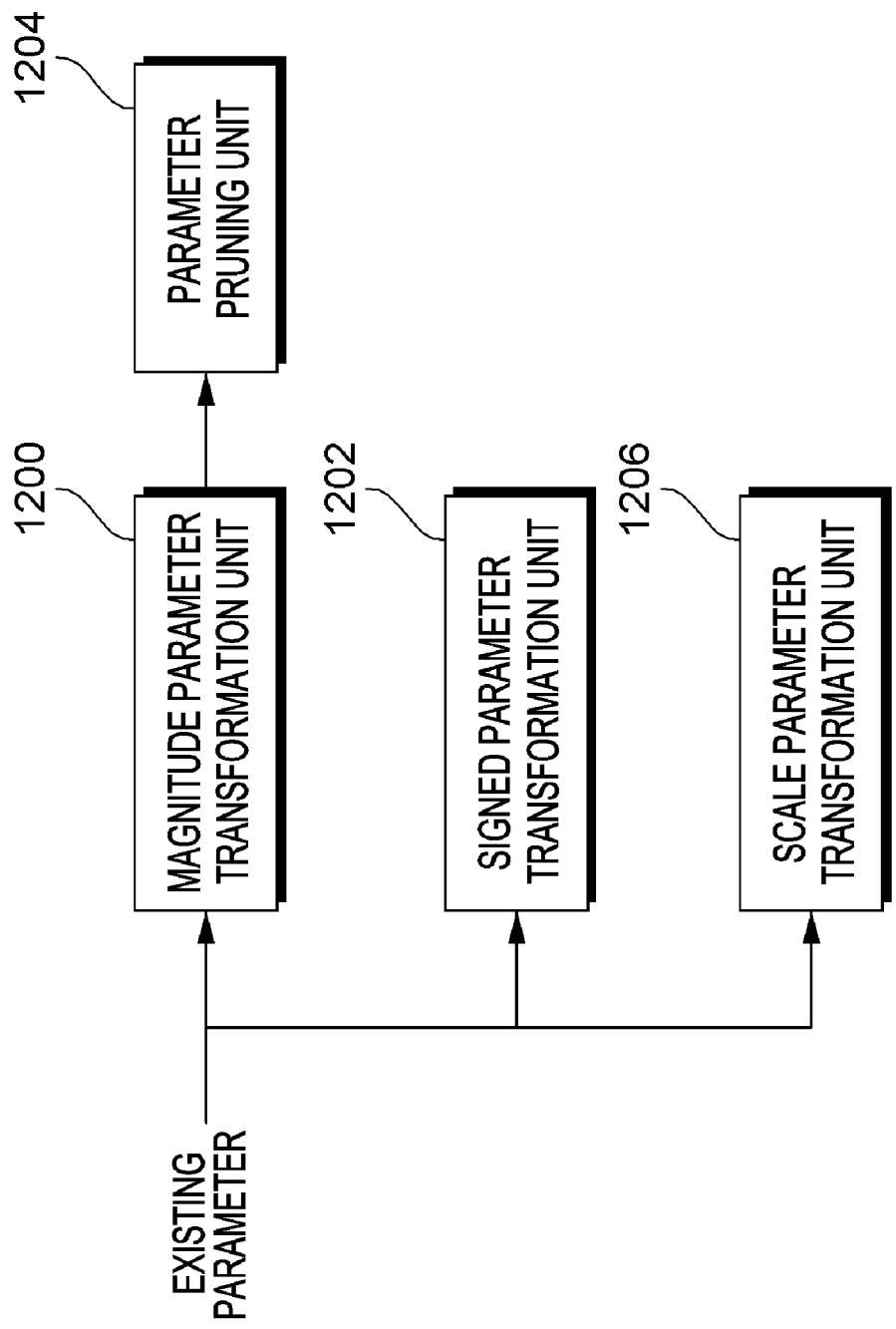
FIG. 12 is a diagram illustrating a detailed configuration of a parameter optimization unit of FIG. 11 according to one embodiment of the present invention.

FIG. 12 is a diagram illustrating a detailed configuration of the parameter optimization unit of FIG. 11 according to one embodiment of the present invention.

Referring to FIGS. 11 and 12, the parameter optimization unit 120 according to one embodiment of the present invention may include a magnitude parameter transformation unit 1200, a signed parameter transformation unit 1202, a parameter pruning unit 1204, and a scale parameter transformation unit 1206.

The signed parameter transformation unit 1202 transforms the existing parameter into a signed parameter. The magnitude parameter transformation unit 1200 transforms the existing parameter into a magnitude parameter having a single value for each channel. The scale parameter transformation unit 1206 transforms the existing parameter into a scale parameter.

Also, the parameter pruning unit 1204 prunes the transformed magnitude parameter to produce an optimized parameter. For example, when a value of a predetermined magnitude parameter is smaller than a preset reference value, the magnitude parameter of the corresponding channel is pruned.

The parameter pruning unit 1204 according to one embodiment of the present invention calculates a reference value using an average value of a magnitude parameter and a magnitude distribution for each input channel, or an average value of a magnitude parameter and a magnitude distribution for each input and output channel, and omits a convolution computation of a corresponding channel by setting the value of the magnitude parameter to zero when the value of the magnitude parameter is smaller than the calculated reference value.

In addition, when the pruning is performed using an average value of magnitude parameters of input channels constituting a predetermined layer and a magnitude distribution, the parameter pruning unit 1204 may calculate a reference value to be the product of a layer-specific constant and an average value of magnitude parameters of input channels, and when a value of a magnitude parameter of a predetermined input channel is smaller than the reference value, prune the magnitude parameter of the corresponding channel by changing the value of the magnitude parameter to zero.

Moreover, when the pruning is performed using an average value of magnitude parameters and a magnitude distribution of input channels and output channels constituting a predetermined layer, the parameter pruning unit 1204 may calculate a reference value to be the product of the layer-specific constant and the average value of magnitude parameters of the input channels and output channels, and when a value of a magnitude parameter of a predetermined input channel is smaller than the reference value, prune the magnitude parameter of the corresponding channel by changing the value of the magnitude parameter to zero.

While the present invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A computer-implemented method of convolutional neural network parameter adjustment and training the convolutional neural network, the convolutional neural network comprising a plurality of channels of at least one convolution layer, the method comprising:
   determining whether or not a learned parameter is present;
   when the learned parameter is present,
      transforming, with a processor, a first parameter of the convolutional neural network into a signed parameter and a magnitude parameter having a single value for each channel;
      generating, with the processor, a second parameter by pruning the magnitude parameter;
      training the convolutional neural network with the second parameter to generate the learned parameter;
   when the learned parameter is not present,
      generating an initial parameter through parameter initialization, wherein the second parameter is generated for the initial parameter;
      training the convolutional neural network with the second parameter to generate the learned parameter; and
   repeatedly performing the above steps,
   wherein the pruning comprises calculating a reference value by using an average value and a magnitude distribution of the magnitude parameter for each input channel or an average value and a magnitude distribution of the magnitude parameter for each input and output channel; and setting the magnitude parameter having a value smaller than the calculated reference value to zero, thereby enabling omission of a convolution computation of a corresponding channel,
   wherein when pruning is performed using the average value of magnitude parameters and a magnitude distribution of input channels constituting a predetermined layer, the reference value is calculated as a product of a layer-specific constant and the average value of the magnitude parameters of the input channels and when a value of a magnitude parameter of a predetermined input channel is smaller than the reference value, the pruning is performed by changing the value of the magnitude parameter of the corresponding channel to zero, and when the pruning is performed using the average value of magnitude parameters and a magnitude parameter of input and output channels constituting a predetermined layer, the reference value is calculated as a product of the layer-specific constant and the average value of magnitude parameters of the input channels and output channels and when a value of a magnitude parameter of a predetermined input channel is smaller than the reference value, the pruning is performed by changing the value of the magnitude parameter of the corresponding channel to zero, and
   wherein a value of the layer-specific constant is determined according to a convolution parameter distribution for each layer.

2. The method of claim 1, wherein the signed parameter determines a direction of elements for each channel of the first parameter and the magnitude parameter is obtained by adjusting weights to a single representative value for each channel of the first parameter.

3. The method of claim 1, wherein the transforming comprises generating the magnitude parameter by calculating an average of absolute values of elements for each channel of the first parameter.

4. The method of claim 1, wherein the transforming comprises generating the signed parameter by representing, as "0" when an element value of the signed parameter that corresponds to a channel of the first parameter which has a predetermined constituent element smaller than zero and by representing, as "1" when an element value of the signed parameter that corresponds to a channel of the first parameter which has a predetermined constituent element greater than or equal to zero.

5. The method of claim 1, further comprising transforming the first parameter of the neural network into a scale parameter.

6. The method of claim 5, further comprising:
   variably allocating a bit of the scale parameter; and
   quantizing a range and a weight of a value of a scale parameter element according to a user's selection.

7. A computer-implemented method of convolutional neural network parameter adjustment and training the convolutional neural network, the convolutional neural network comprising a plurality of channels of at least one convolution layer, the method comprising:
   determining whether or not a learned parameter is present;
   when the learned parameter is present,
      loading, with a processor, a first parameter and input channel data of the convolutional neural network to a memory;
      transforming, with the processor, the first parameter into a signed parameter and a magnitude parameter having a single value for each channel and generating a second parameter by pruning the magnitude parameter;
      inferring, with the processor, the second parameter and the input channel data by performing a convolution computation on the second parameter and the input channel data;
      correcting, with the processor, the second parameter, wherein the correcting of the second parameter comprises computing a backpropagation;
      updating, with the processor, the first parameter to the corrected second parameter as the learned parameter;
   when the learned parameter is not present,
      generating an initial parameter through parameter initialization, wherein the second parameter is generated for the initial parameter;

inferring, with the processor, the second parameter and the input channel data by performing the convolution computation on the second parameter and the input channel data;
correcting, with the processor, the second parameter;
updating, with the processor, the corrected second parameter as the learned parameter; and
repeatedly performing the above steps,
wherein the pruning comprises calculating a reference value by using an average value and a magnitude distribution of the magnitude parameter for each input channel or an average value and a magnitude distribution of the magnitude parameter for each input and output channel; and setting the magnitude parameter having a value smaller than the calculated reference value to zero, thereby enabling omission of a convolution computation of a corresponding channel,
wherein when pruning is performed using the average value of magnitude parameters and a magnitude distribution of input channels constituting a predetermined layer, the reference value is calculated as a product of a layer-specific constant and the average value of the magnitude parameters of the input channels and when a value of a magnitude parameter of a predetermined input channel is smaller than the reference value, the pruning is performed by changing the value of the magnitude parameter of the corresponding channel to zero, and
when the pruning is performed using the average value of magnitude parameters and a magnitude parameter of input and output channels constituting a predetermined layer, the reference value is calculated as a product of the layer-specific constant and the average value of magnitude parameters of the input channels and output channels and when a value of a magnitude parameter of a predetermined input channel is smaller than the reference value, the pruning is performed by changing the value of the magnitude parameter of the corresponding channel to zero, and
wherein a value of the layer-specific constant is determined according to a convolution parameter distribution for each layer.

8. The method of claim 7, wherein the inferring the second parameter and the input channel data by performing the convolution computation on the second parameter and the input channel data comprises;
loading the second parameter to the memory, determining whether or not a value of a magnitude parameter included in the loaded second parameter is zero; and
omitting a convolution computation process when the value of the magnitude parameter is zero.

9. The method of claim 8, wherein the inferring the second parameter and the input channel data by performing the convolution computation on the second parameter and the input channel data further comprises:
determining a direction of data by performing a bitwise operation on the signed parameter and the input channel data when the value of the magnitude parameter is not zero;
performing an addition operation on a number of input channel data corresponding to a convolution parameter filter size; and
performing a single multiplication operation on the magnitude parameter and the input channel data.

10. The method of claim 8, wherein the inferring by performing the convolution computation on the second parameter and the input channel data further comprises reducing an error of a computation result by differentially applying a weight to the magnitude parameter using a scale parameter.

11. A convolutional neural network computation apparatus, of convolutional neural network parameter adjustment and training the convolutional neural network, the convolutional neural network comprising a plurality of channels of at least one convolution layer, the apparatus comprising a circuitry of a processor and a memory device communicatively coupled to the processor, the memory device stores instructions operable when executed by the processor, and the circuitry comprising:
a signed parameter transformation processor configured to transform a first parameter into a signed parameter;
a magnitude parameter transformation processor configured to transform the first parameter into a magnitude parameter having a single value for each channel;
a parameter pruning processor configured to prune the magnitude parameter to generate a second parameter,
wherein the following steps are repeatedly performed with the neural network computation apparatus:
determining whether or not a learned parameter is present;
when the learned parameter is present,
loading the first parameter and input channel data of the convolutional neural network to the memory;
transforming the first parameter into the signed parameter and the magnitude parameter having the single value for each channel;
generating the second parameter by pruning the magnitude parameter;
training the convolutional neural network with the second parameter to generate the learned parameter;
when the learned parameter is not present,
generating an initial parameter through parameter initialization, wherein the second parameter is generated for the initial parameter; and
training the convolutional neural network with the second parameter for the learned parameter,
wherein the parameter pruning processor is further configured to calculate a reference value by using an average value and a magnitude distribution of a magnitude parameter for each input channel or an average value and a magnitude distribution of a magnitude parameter for each input and output channel and sets a magnitude parameter having a value smaller than the calculated reference value to zero, thereby enabling omission of a convolution computation of a corresponding channel,
wherein when pruning is performed using the average value of magnitude parameters and a magnitude distribution of input channels constituting a predetermined layer, the parameter pruning processor calculates the reference value as a product of a layer-specific constant and the average value of the magnitude parameters of the input channels, and when a value of a magnitude parameter of a predetermined input channel is smaller than the reference value, performs the pruning by changing the value of the magnitude parameter of the corresponding channel to zero, and
when the pruning is performed using the average value of magnitude parameters and a magnitude parameter of input and output channels constituting a predetermined layer, the parameter pruning processor calculates the reference value as a product of the layer-specific constant and the average value of magnitude parameters of the input channels and output channels, and when a value of a magnitude parameter of a predetermined input channel is smaller than the reference value, performs the pruning by changing the value of the magnitude parameter of the corresponding channel to zero, and wherein a value of the layer-specific constant is determined according to a convolution parameter distribution for each layer.

12. The convolutional neural network computation apparatus of claim 11, further comprising a scale parameter transformation processor configured to transform the first parameter into a scale parameter.

13. The convolutional neural network computation apparatus of claim 11, further comprising an inference processor configured to perform a convolution computation on the second parameter and the input channel data.

14. The convolutional neural network computation apparatus of claim 13, wherein the inference processor determines whether or not a value of the magnitude parameter included in the second parameters is zero, and omits a convolution computation process when the value of the magnitude parameter is zero.

15. The convolutional neural network computation apparatus of claim 13, wherein the inference processor reduces an error of a computation result by differentially applying a weight to the magnitude parameter using a scale parameter.

* * * * *